United States Patent
Victor et al.

(10) Patent No.: US 10,144,520 B2
(45) Date of Patent: Dec. 4, 2018

(54) DE-ICING SYSTEM WITH THERMAL MANAGEMENT

(71) Applicant: Rohr, Inc., Chula Vista, CA (US)

(72) Inventors: Jared Victor, San Diego, CA (US); Chad Franks, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/252,270

(22) Filed: Apr. 14, 2014

(65) Prior Publication Data

US 2015/0291284 A1    Oct. 15, 2015

(51) Int. Cl.
*B64D 15/02* (2006.01)
*B64D 15/04* (2006.01)
*B64D 33/02* (2006.01)

(52) U.S. Cl.
CPC ...... *B64D 15/04* (2013.01); *B64D 2033/0233* (2013.01)

(58) Field of Classification Search
CPC .......... B64D 15/04; B64D 15/02; F02C 7/047
See application file for complete search history.

(56) References Cited

U.S. PATENT DOCUMENTS

| | | | |
|---|---|---|---|
| 3,981,466 A * | 9/1976 | Shah | B64D 15/02 165/42 |
| 4,482,114 A * | 11/1984 | Gupta | B64D 15/02 244/118.5 |
| 4,550,573 A * | 11/1985 | Rannenberg | B64D 13/06 62/172 |
| 4,802,621 A | 2/1989 | Standke | |
| 4,831,819 A | 5/1989 | Norris et al. | |
| 5,063,963 A | 11/1991 | Smith | |
| 5,114,100 A * | 5/1992 | Rudolph | B64C 21/06 244/130 |
| 5,161,364 A | 11/1992 | Brunn et al. | |
| 5,228,643 A * | 7/1993 | Manda | B64D 15/02 244/134 B |
| 5,540,252 A | 7/1996 | Brunn | |
| 5,890,677 A | 4/1999 | Guillot et al. | |
| 6,442,944 B1 * | 9/2002 | Skur, III | B64D 13/00 244/134 R |
| 6,443,944 B1 | 9/2002 | Doshi | |
| 6,634,596 B2 * | 10/2003 | Albero et al. | 244/53 A |
| 7,900,872 B2 | 3/2011 | Sternberger | |
| 7,909,261 B2 | 3/2011 | Ellstrom et al. | |
| 7,959,109 B2 | 6/2011 | Dasilva et al. | |
| 8,387,950 B2 * | 3/2013 | Hummel | B64D 15/04 137/68.11 |
| 9,346,549 B2 * | 5/2016 | Pirat | B64D 15/04 |
| 2013/0199218 A1 * | 8/2013 | Scheibert | F25D 21/04 62/80 |
| 2013/0239542 A1 * | 9/2013 | Dasgupta | F02C 7/143 60/39.093 |
| 2015/0034767 A1 * | 2/2015 | Pirat | B64D 15/04 244/134 B |

* cited by examiner

*Primary Examiner* — Philip J Bonzell
(74) *Attorney, Agent, or Firm* — O'Shea Getz P.C.

(57) ABSTRACT

An aircraft component assembly has a structural body and a thermal management de-icing system for minimizing or preventing ice build-up on leading edges of the body. The system includes a supply line for flowing heated fluid to the leading edges and a cooling device that interposes the supply line to prevent overheating of the leading edges thus protecting bodies that may be made of composite materials that are more susceptible to heat.

18 Claims, 4 Drawing Sheets

DE-ICING SYSTEM WITH THERMAL MANAGEMENT

BACKGROUND

The present disclosure relates to an aircraft component assembly and more particularly to an aircraft component assembly having a thermal management de/anti-icing system.

Aircraft components such as nacelles have leading edges that may have a tendency toward ice build-up during adverse weather conditions. This icebuild-up may increase the weight of components, increase aerodynamic drag and alter airflow surfaces which can cause performance degradation of (for example) the fan and/or engine in the nacelle region. To address this icing issue, aircraft components may have an anti-ice or de-icing systems. An anti-icing system is intended to heat the surface of the component to a high enough temperature that when water droplets impinge, they either evaporate or they do not freeze and run-off of the component surface. A de-icing system is intended to be activated when ice may or already has formed, and provides enough thermal energy to the surface of the component to detach the ice and allow it to fall off. (We will refer herein to both types of systems simply as "de-icing.") Many current de-icing systems utilize hot engine bleed air as the heat source which is channeled to the aircraft component such as a nacelle inlet leading edge where it is used to prevent or melt ice formation. Because the bleed air is very hot (for example 700-1,000 degrees Fahrenheit), the nacelle inlet leading edges are typically made of a metal material so that their mechanical properties and performance do not degrade when heated to the temperature of the bleed air.

With recent advancements in material technology, lightweight composite materials are being more readily used in nacelle manufacturing. Unfortunately, such composite materials are not capable of handling the elevated temperatures produced by typical de-icing systems using bleed air. Other thermal de-icing systems have been proposed which utilize electric resistive heating on the backside of the aircraft component to be de-iced instead of bleed air, where the temperature is better controlled by the thermal-electric system to permit the use of lightweight composite materials. But these types of systems have their own drawbacks, including cost and complexity. For this and other reasons, there is a need to improve de-icing systems to enable, for example, greater flexibility in the use of composite materials.

SUMMARY

An aircraft component assembly according to one, non-limiting, embodiment of the present disclosure includes a structural body; and a thermal management system for the prevention of ice build-up on the structural body, the thermal management system having a first line for the flow of heated supply air and located upstream from and communicating with the structural body to heat it and prevent or remove ice build-up, and a cooling device interposed with the first line to reduce supply air temperature.

Additionally to the foregoing embodiment, the structural body is made of a composite material.

In the alternative or additionally thereto, in the foregoing embodiment, the composite material is epoxy based.

In the alternative or additionally thereto, in the foregoing embodiment, the composite material is polyimide based.

In the alternative or additionally thereto, in the foregoing embodiment, the heated supply air is compressed air from a compressor section of an engine.

In the alternative or additionally thereto, in the foregoing embodiment, the cooling device includes a second line communicating with the first line for the flow of cooling air that mixes with the heated supply air.

In the alternative or additionally thereto, in the foregoing embodiment, the cooling device is a heat sink that cools the heated supply air to a temperature safe for the structural body.

In the alternative or additionally thereto, in the foregoing embodiment, the heatsink is an elongated portion of the first line in an area where heat will conduct out of the first line to cool the heated supply air temperature.

In the alternative or additionally thereto, in the foregoing embodiment, the elongated portion is attached to a metallic plate that is exposed on one side to the ambient air flow.

In the alternative or additionally thereto, in the foregoing embodiment, the assembly includes a Venturi tube joining the first and second lines.

In the alternative or additionally thereto, in the foregoing embodiment, the composite material is bismaleimide based.

In the alternative or additionally thereto, in the foregoing embodiment, the heated supply air is compressed air from a compressor section of an engine.

In the alternative or additionally thereto, in the foregoing embodiment, the cooling device includes a control valve in the second line.

In the alternative or additionally thereto, in the foregoing embodiment, the first line is interposed by a control valve.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
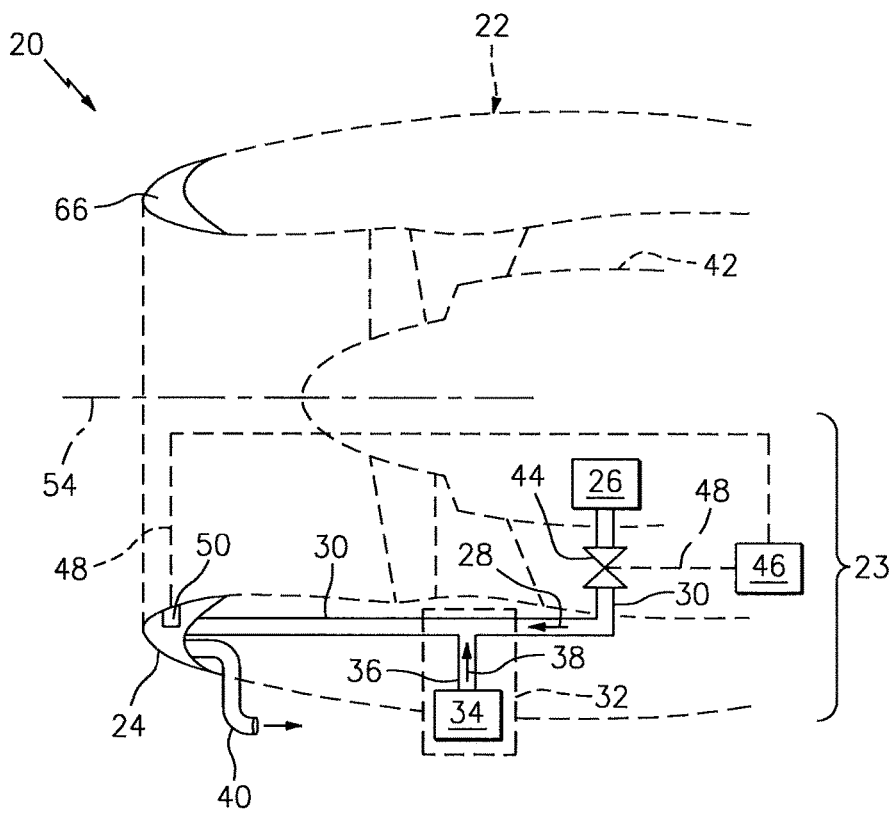
FIG. 1 is a schematic of an aircraft component assembly illustrated on a turbofan engine according to one, non-limiting, embodiment of the present disclosure.

Referring to FIG. 1, an aircraft component assembly 20 is illustrated having a structural body 22 and a thermal management de-icing system 23. The structural body 22 may include a leading edge 24 that is susceptible to the build-up of ice during adverse weather conditions. The thermal management de-icing system 23 may further include a heat source 26 for producing a heating fluid 28 (that may be air as one, non-limiting, example), a supply line 30 in fluid communication between the heat source 26 and the leading edge 24, and a cooling device 32 interposing the supply line 30 and capable of cooling the heating fluid 28. It is contemplated and understood that the term 'line' may include any structure that defines a channel for flowing fluid. The aircraft component assembly 20 may be, as one example, a nacelle assembly. More specifically, the structural body 22 is illustrated as a nacelle inlet of a propulsion system; however, it is understood that the structural body 22 may be any body susceptible to ice build-up, and may also include, as non-limiting examples, a nacelle pylon, an aircraft wing, an aircraft tail, and a helicopter blade.

The cooling device 32 may include a cold source 34 and a supplemental cooling line 36 that is in fluid communication between the cold source 34 and the supply line 30. A cooling fluid 38 (that may be air as one example) flows from the cold source 34 and into the supply line 30 for limiting or controlling the fluid temperature at the leading edge 24. If the heating and cooling fluids 28, 38 are air, the respective supply and cooling lines 30, 36 may be open-looped thus having a common outlet 40 that may be in fluid communication with external air about the aircraft. For further design simplicity, system robustness and minimal weight considerations, the heat source 26 may be non-electric and may further be bleed air extracted from an aircraft engine 42 and partially heated through kinetic energy of an upstream engine compressor as one, non-limiting example. For similar considerations and as one example, the cold source 34 may be an inlet of the cooling line 36 that accepts ambient air (e.g. air external to the engine and/or aircraft).

The thermal management de-icing system 23 may further include a flow control or isolation valve 44 in the supply line 30 upstream of the cooling device 32. Control of the valve 44 between open, intermediate, and closed positions may be controlled by a controller 46 that sends and receives electric signals 48 between the valve 44 and a temperature sensor 50 strategically located at the leading edge 24. When icing is not a concern, the control valve 44 may be closed, and during icing conditions the valve 44 may be open. It is further contemplated and understood that other control valve orientations may be applied including pressure regulated systems, and systems including placement of a control valve in the supply line 30 downstream of the cooling device 32 and/or in the cooling line 36, and may be dependent upon a wide variety of factors including ambient air temperature extremes, bleed air temperature, a need to conserve heated bleed air, engine operating conditions, positioning of sensor 50, pressure, and other factors.

The leading edge 24 of the structural body 22 may not be made of a metal material capable of handling elevated temperatures without incurring structural damage or other degradation. The entire structural body 22 or at least the leading edge 24 may be made of a light-weight composite material and controllably heated with the supplemented heating fluid 28 without incurring elevated temperature damage. Non-limiting examples of such composite materials include an epoxy based material, a bismaleimide (BMI) based material, and a polyimide (PI) based material. Use of the thermal management de-icing system 23 may facilitate a reduction in seams between parts. If the leading edge 24 is constructed of a composite material system, it may be advantageous to continue the leading edge aft and to the forward edge of the fan cowl as a single, unitary component. If the entire inlet is a single piece, then the number of seams and their associated steps and gaps are minimized, and less steps and gaps reduces aerodynamic drag.

Figure 2:
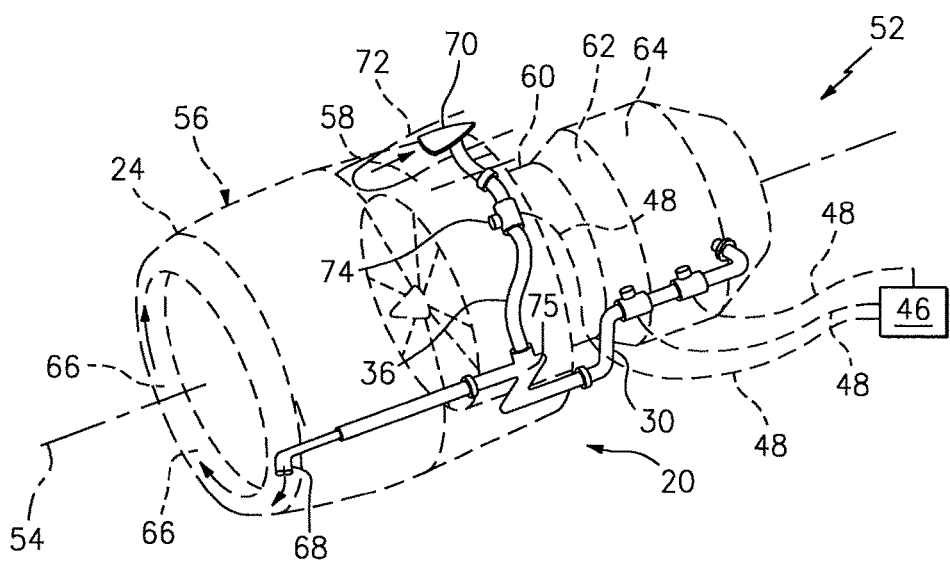
FIG. 2 is a perspective view of the aircraft component assembly on the turbofan engine with portions of a nacelle removed to show internal detail and a cooling device of the assembly including an air intake integrated into an external surface of a nacelle pylon for receiving external air to the aircraft as a cold source.

Referring to FIG. 2, the aircraft component assembly 20 may be part of a turbofan engine 52 constructed to rotate about an engine axis 54. The engine 52 may have a nacelle 56 that supports and generally surrounds an upstream fan section 58 and a downstream engine core that may include a compressor section 60, a combustor section 62 and a turbine section 64. Generally, the fan section 58 supplies or drives air into both a bypass flowpath located radially outward from and surrounding the engine core and an inner engine core flowpath. The bypass air (see arrow 65 in FIG. 3) flowing through the bypass flowpath may provide the majority of engine propulsion for the aircraft. The core-air flowing through the core flowpath may first be compressed/pressurized by the compressor section 60, and then generally divided into supplemental air and combustion air. The pressurized supplemental air flows, and is therein distributed, through a network of flowpaths for cooling combustor walls of the combustor section 62 and then components of the turbine section 64 such as, for example, airfoils.

The high pressure combustion air received from the compressor section 60, enters the combustor section 62 and is mixed with fuel and burned producing energy. This heated/combusted air is then expanded through the turbine section 64 transferring the energy to the turbine section that, in-turn, drives at least two concentrically located shafts (not shown) that power the fan section 58 and compressor section 60.

More traditional turbofan engines may have a bypass airflow to core airflow ratio (i.e. bypass ratio) of about six (6:1). More recent high-bypass ratio engines, such as an elliptical geared turbofan engine may have greater bypass ratios and that may exceed ten (10:1). Aircraft and associated nacelles are being built lighter using current composite material technology. Engines, like the geared turbofan, others, and future engines are running hotter producing hotter bleed air for anti/de-icing operations.

Compressed air from the compressor section 60 may be used as the hot bleed air for anti-icing operations. This bleed air when extracted at or downstream of the compressor section 60 may be anywhere between 700 to 1100 degrees Fahrenheit. Such temperatures exceed the design limitations of most typical composite material systems used on aircraft structures like nacelles. For example, epoxy based composites should not be exposed to temperatures exceeding about 250 degrees Fahrenheit and polyimide based composites should not be exposed to temperatures that exceed about 450 degrees Fahrenheit. Therefore, thermal management or cooling of this bleed air is necessary to cool this hotter bleed air and manage anti-icing operations of composite materials that are more susceptible to over-heating than more traditional metallic components. It is further contemplated and understood that bleed air greater than 1100 degrees Fahrenheit may be extracted from the engine where engine efficiency demands may dictate. As a consequence, the system 23 may also be beneficially applied in some cases to nacelles constructed of traditional metallic components.

Referring to FIGS. 1 and 2, the structural body 22 of the aircraft component assembly 20 may further include a plenum 66 defined at least in-part by an interior surface of the leading edge 24. The plenum 66 may be annular in shape. Line 30 of the thermal management de-icing system 23 may further include an outlet swirl nozzle 68 disposed in the plenum 66 and positioned to urge circular or circumferential flow in the plenum in a single direction (i.e. clockwise or counterclockwise direction about the engine axis 54). The heat source 26 may be hot bleed air controllably taken from the compressor section 60 of the turbofan engine 52. It is further contemplated and understood that the hot bleed air may be taken at any point downstream of the compressor section 60 and may not be limited to the compressor air and/or pressurized supplemental air flow.

The cold source 34 of the cooling device 32 may include an air inlet which could take the form of a scoop 70 carried by an exterior skin of a pylon 72 of the nacelle 56, or alternatively the scoop 70 could be mounted on an external surface of the nacelle, or inside the fan bypass duct, or an inlet may be positioned anywhere where a source of cold air may be obtained. The cooling device 32 may further include a regulating or control valve 74 located in the line 36 for controlling the rate of cooling air 38 flow in line 36. Lines 36 and 30 may join and integrate the hot and cold air flow with a Venturi tube 75 (see FIG. 2) where the flow of bleed air is throttled through an orifice and a region of low pressure is created to pull in the cold air 38. When the aircraft is on the ground and not in motion, de-icing can still be turned on and cooling air 38 may still flow through line 36 via the Venturi effect. Also, during flight the Venturi tube 75 may ensure that cooling air 38 is drawn into and mixed with the heating fluid 28, instead of having the heating fluid 28 reverse flow through the cooling device 32 and escape out of the scoop 70. Other Venturi arrangements may be applicable and known to those skilled in the art.

Figure 3:
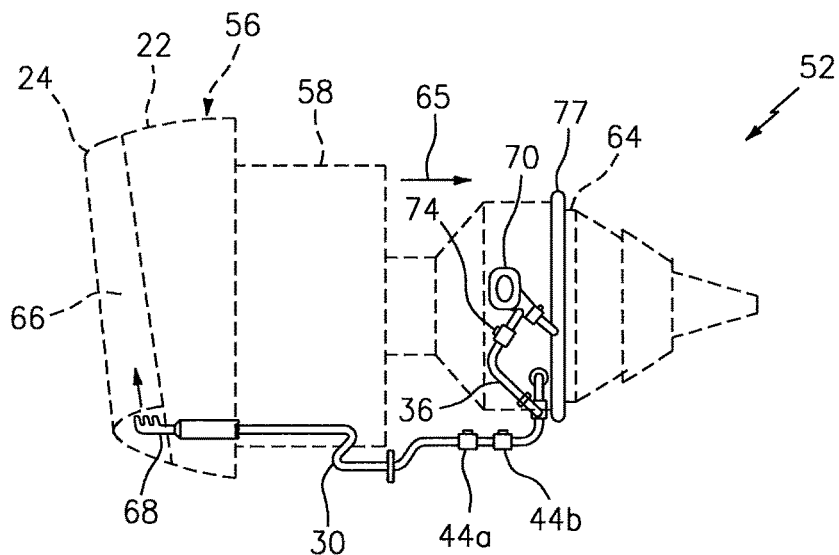
FIG. 3 is a side view of the aircraft component assembly on a turbofan engine with portions of the nacelle removed to show internal detail and the cooling device of the assembly including an air intake or scoop for receiving turbine cooling air as the cold source.

The controller 46 may function to maintain a consistent flow rate, mass flow rate, or pressure, possibly at a pre-scribed temperature at or near the outlet nozzle 68. This may be achieved through control of the control valve 74 of the cooling device 32 and the control valve 44 of the thermal management de-icing system 23. As shown in FIG. 3, the valve 44 may include regulating or control valve 44a and an isolation valve 44b upstream of control valve 44a. Alternatively, valve 44 may include redundant valves 44a, 44b solely for system robustness and safety precautions. Flow rate and temperature requirements of the de-icing air flow may be based on the temperature of ambient air around the nacelle inlet 22 and/or the inlet nose lip, and the rate at which air is traveling past the surface to provide cooling. Due to these factors, less heating air may be required in a ground based de-icing condition since the air would be at a higher temperature and at a slower flow rate. Both conditions would reduce the requirement for thermal energy to maintain the temperature of the nose lip at a point that would provide the de-icing capability. However, a sufficient flow rate should be maintained to ensure heating is not localized and the entire nose lip is at a sufficient temperature.

Referring to FIG. 3, an alternative cold source 34 is illustrated, that may share the air scoop 70 with another (or pre-existing) cooling system 77 of the turbine section 64 such as, for example, an active clearance control cooling system. That is, the air scoop 70 takes a portion of the bypass air 65 from the fan section 58 as a cooling source for both the de-icing system 23 and the turbine system 77. The air scoop 70 may be located at or near the turbine section 64 for receiving a portion of the bypass air 65. The cooling device 32 extracts a portion (i.e. cooling air 38) of this bypass air portion for cooling the hot bleed air.

Figure 4:
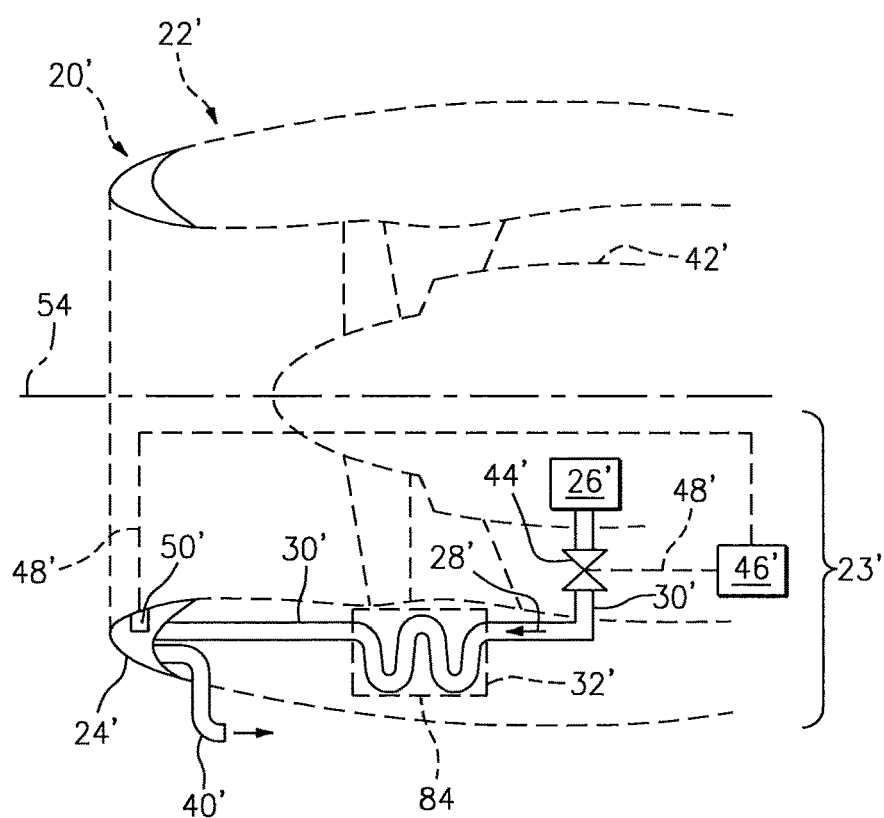
FIG. 4 is a schematic of a second embodiment of an aircraft component assembly illustrated on the turbofan engine, and having a heat sink as a cooling device.

Referring to FIG. 4, a second embodiment of an aircraft component assembly is illustrated wherein like elements to the first embodiment have the same element numbers except with the addition of a prime symbol. An aircraft component assembly 20' has a cooling device 32' that may be a passive heat sink. More specifically, the heat sink 32' may be an elongation of a portion of the supply line 30' to enable additional heat conduction through the walls of the line 30' and into the surrounding ambient air. With application of the heat sink 32', the line 30' may include an outlet 40' that only flows and/or expels heating fluid 28' (i.e. no supplemental cooling air). The elongation of the supply line 30' may be in the shape of a spiral that wraps around the air nacelle inlet, and may further transfer heat through the external skin of the nacelle inlet. Alternatively, the heat sink 32' may include cooling fins, such as a radiator, to further enhance heat conduction.

The heat sink 32' may further include a base plate 84 as part of the external skin of the nacelle. Plate 84 may be a located at a pre-determined circumferential location in the nacelle or it may be ring shaped and circumferentially continuous. A portion of supply line 30' may be attached to, or formed to, the plate 84 such that heat is transferred through the plate and into the surrounding environment (i.e. external to the nacelle). If the plate 84 is not circumferentially continuous, the elongation of the supply line 30' may not be spiral in shape and may alternatively be sinuous where the line connects to the plate. The shape and configuration of the plate 84 and line 30' are determined by the needed heat transfer that is dependent upon the temperature limitations internal to the nacelle (e.g. the nacelle cavity containing the supply line 30') and the surrounding ambient air temperature(s).

Figure 5:
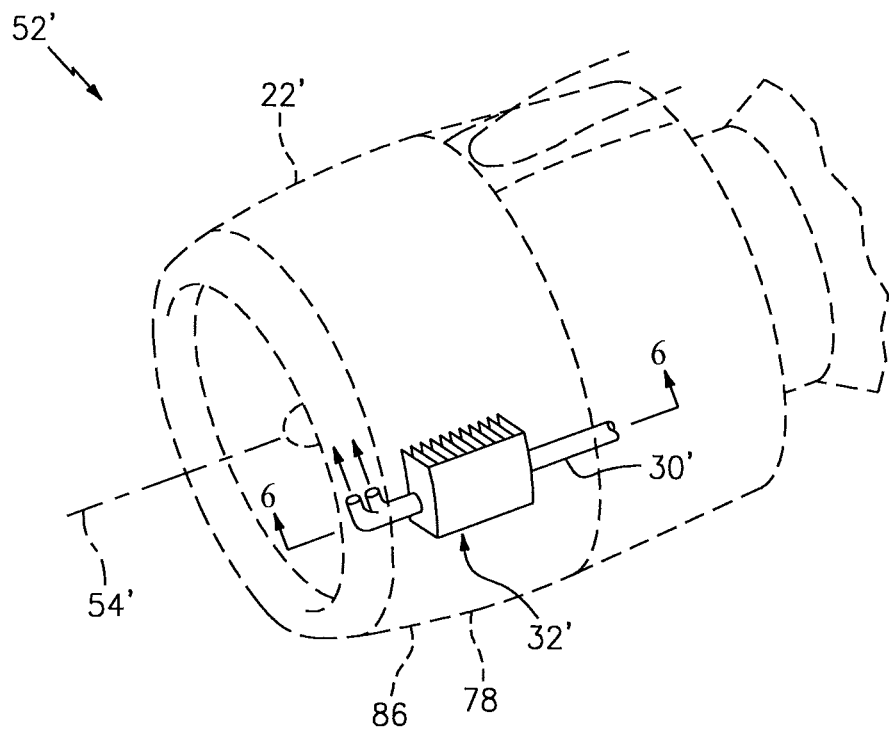
FIG. 5 is a partial perspective view of the second embodiment of the aircraft component assembly illustrated on the turbofan engine shown in phantom, and wherein the heat sink is a radiator.
Figure 6:
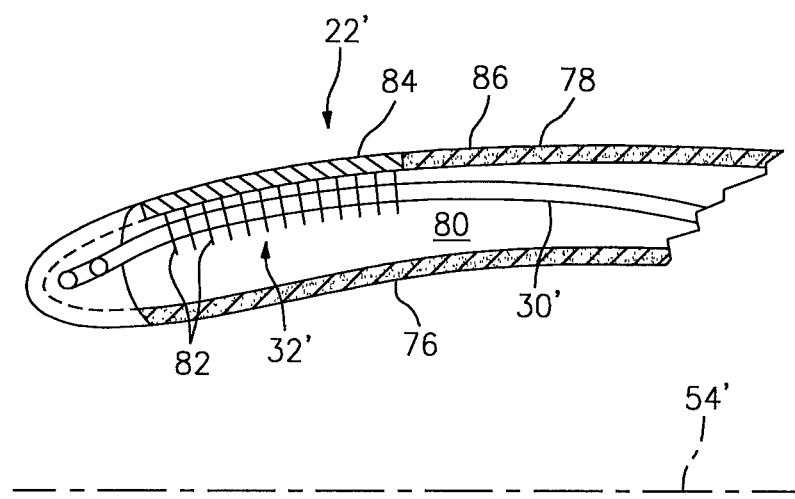
FIG. 6 is a cross section of the radiator taken along line 6-6 of FIG. 5.

Referring to FIGS. 5 and 6, the heat sink 32' is illustrated as a radiator located substantially inside a nacelle inlet of a nacelle 56' as the structural body 22'. The nacelle inlet 22' may have inner and outer walls 76, 78 spaced radially from one-another, concentric to the engine axis 54', and defining an annular chamber 80, there-between. The radiator 32' may be in the chamber 80 and may include a plurality of thermally conductive fins 82 with the line 30' running multiple passes through each fin. Each fin 82 may be rigidly secured to a base plate 84 for structural support. The fins 82 transfer heat from line 30' and into chamber 80 through convection, and may also transfer heat into the base plate 84 through conduction. The base plate 84 may be mounted to the outer wall 78 of the nacelle inlet 22', and may be metallic or made of a thermally conductive material for transferring heat from the fins 82 and to the surrounding ambient air of the aircraft similar to the heat sink best shown in FIG. 4.

The adjacent outer wall 78 may be made of a composite material that is generally not thermally conductive and/or heat resistant. Therefore, the base plate 84 may be an integral part of the outer wall 78 sharing a common and/or contiguous external surface 86. As high velocity ambient air passes the plate 84, efficient heat convection occurs from the plate 84 to the ambient air surrounding the aircraft. It is further contemplated and understood that another, non-limiting, example may include the nacelle inlet 22' being entirely made of a composite material with the base plate 84 being secured inside the nacelle inlet 22' (not shown). In such instances, the radiator 32' may reduce anti/de-icing air temperature in the line 30' substantially through heat convection from the fins 82 and to the ambient air in the annular chamber 80.

Figure 7:
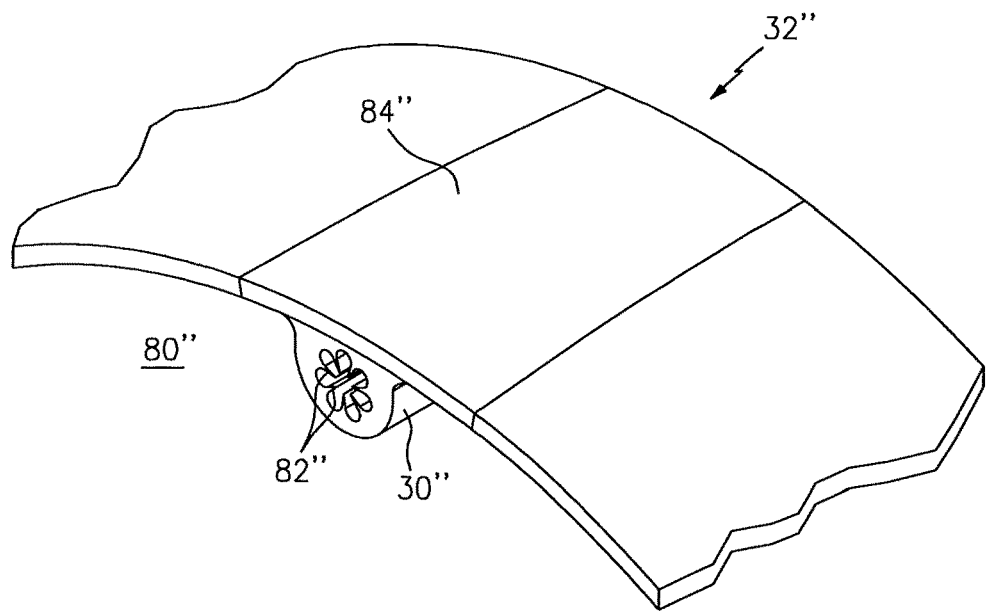
FIG. 7 is a partial cross section of a third embodiment of a heat sink of an aircraft component assembly.

Referring to FIG. 7, a third embodiment of an aircraft component assembly is illustrated wherein like elements to the second embodiment have the same element numbers except with, the addition of a double prime symbol. A heat sink 32" may transfer heat primarily through a base plate 84" attached directly to an elongated, sinuous, or spiral portion of a supply line 30", and into the surrounding ambient air external of the nacelle. This primary direction of heat transfer to the surrounding ambient air environment, as oppose to heat transfer into an annular chamber 80" is advantageous when temperatures within the chamber are projected to be too high to achieve desired heat transfer. The line 30" may further include cooling fins 82" that are internal to the line, co-extend longitudinally with the line, and spaced circumferentially apart from one-another.

Figure 8:
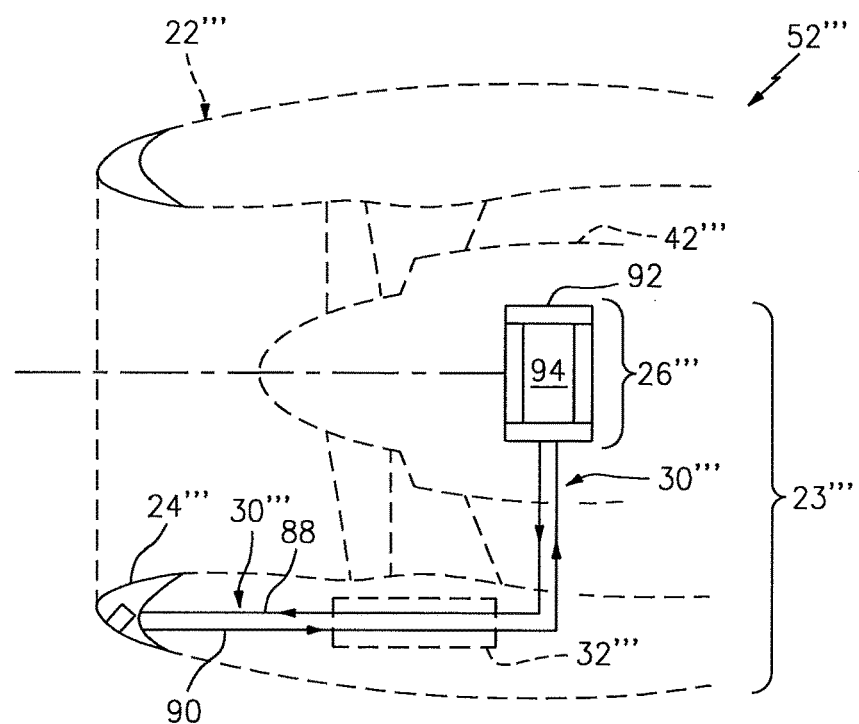
FIG. 8 is a schematic of a third embodiment of an aircraft component assembly illustrated on the turbofan engine.

Referring to FIG. 8, a fourth embodiment of an aircraft component assembly is illustrated wherein like elements to the first embodiment have the same element numbers except with the addition of a triple prime symbol. An aircraft component assembly 20''' has a thermal management de-icing system 23''' that may have a supply line 30''' that is generally closed-loop and includes a supply leg 88 for flowing fluid from a heat source 26''' to a leading edge 24''' of a structure body 22''', and a return leg 90 for returning flow back to the heat source 26'''. The heat source 26''' (as one, non-limiting, example) may include a heat exchanger 92 and a heat generating portion 94 of an operating engine 52'''. One, non-limiting example of a heat generating portion 94 may be an elliptical gear box of a geared turbofan engine 52'''. The heat exchanger 92 may surround the gearbox housing and thus extract heat. As another example, the heat exchanger 92 may be immersed in an oil reservoir (not shown) of the gearbox and thus function to advantageously cool the gearbox oil while extracting the necessary heat for de-icing operations. Flow through the supply line 30''' may be created by a pump (not shown) that is part of the elliptical gear box and/or part of a cooling system for the gearbox known in the art. A cooling device 32''' of the de-icing system 23''' may be associated with at-least the supply line 30''' for cooling the heating fluid. De-icing system 23''' may be advantageous where use of engine cooling air as a heated bleed air source is not desirable due to engine operating efficiency demands and/or advantageous where internal engine components are in need of a cooling means.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

We claim:

1. An aircraft component assembly comprising:
   a structural body of a nacelle assembly for an aircraft propulsion system; and
   a thermal management system configured to prevent ice build-up on the structural body, the thermal management system comprising:
     a first line for a flow of heated supply air and located upstream from and communicating with the structural body to heat the structural body and configured to prevent or remove ice build-up;
     a cooling device interposed with the first line and configured to reduce supply air temperature;
     a control valve interposed in the first line, the control valve located upstream of the cooling device and interfacing to a source of the supply air; and
     a second valve interposed in the first line, the second valve located upstream of the control valve and downstream of the source of the supply air, wherein the second valve is fluidly coupled to the control valve such that the control valve only receives gas provided by the second valve;
   wherein the cooling device includes a second line configured to communicate with the first line for the flow of cooling air that mixes with the heated supply air.

2. The aircraft component assembly set forth in claim 1, wherein the heated supply air is compressed air from a compressor section of an engine.

3. The aircraft component assembly set forth in claim 1, wherein the structural body includes a plenum defined at least in-part by an interior surface of a leading edge of the structural body, wherein the plenum is annular in shape, the aircraft component assembly further comprising:
   an outlet nozzle disposed in the plenum that is configured to urge circular or circumferential flow in the plenum in a single direction.

4. The aircraft component assembly set forth in claim 1, wherein the cooling device includes an air inlet that takes the form of a scoop, and wherein the scoop is configured to take a portion of a bypass air from a fan section as a cooling source for the thermal management system and a turbine system.

5. The aircraft component assembly set forth in claim 1, wherein the first control valve is configured to be open during icing conditions and closed when icing is not a concern.

6. The aircraft component assembly of claim 1, wherein the control valve and the second valve are redundant control valves.

7. The aircraft component assembly of claim 1, wherein the second valve is an isolation valve.

8. The aircraft component assembly set forth in claim 1, wherein the structural body is made of a composite material.

9. The aircraft component assembly set forth in claim 8, wherein the composite material is epoxy based.

10. The aircraft component assembly set forth in claim 8, wherein the composite material is polyimide based.

11. The aircraft component assembly set forth in claim 8, wherein the composite material is bismaleimide based.

12. The aircraft component assembly set forth in claim 1, further comprising:
a Venturi tube joining the first and second lines.

13. The aircraft component assembly set forth in claim 12, wherein the heated supply air is compressed air from a compressor section of an engine.

14. The aircraft component assembly set forth in claim 13, wherein the cooling device includes a second control valve in the second line.

15. An aircraft component assembly comprising:
an engine;
an aircraft structure of a nacelle assembly for the engine, the aircraft structure having an interior surface and an exterior surface exposed to ambient air and susceptible to ice formation;
an anti-icing system that includes a supply line that is configured to deliver heated air from the engine to the interior surface of the aircraft structure, the heated air warming the aircraft structure and inhibiting ice build-up on the exterior surface;
a cooling device associated with the anti-icing system which cools the heated air before it reaches the interior surface of the aircraft structure; and
first and second control valves serially connected and interposed in the supply line, the first and the second control valves located upstream of the aircraft structure and the cooling device and interfacing to the heated air from the engine, and wherein the first and the second control valves are redundant valves.

16. The aircraft component assembly of claim 15, wherein the aircraft structure is made of a composite material.

17. The aircraft component assembly of claim 15, wherein the heated air is extracted from a compressor section of the engine within a temperature range of 700 to 1100 degrees Fahrenheit.

18. The aircraft component assembly of claim 15, wherein the cooling device is configured to provide cooling air to cool the heated air, and wherein the heated air and the cooling air are open-looped and have a common outlet that is configured to be in fluid communication with external air about an aircraft.

* * * * *